July 5, 1932.    H. M. STOLLER    1,866,274
RESILIENT SUPPORT
Filed March 20, 1930
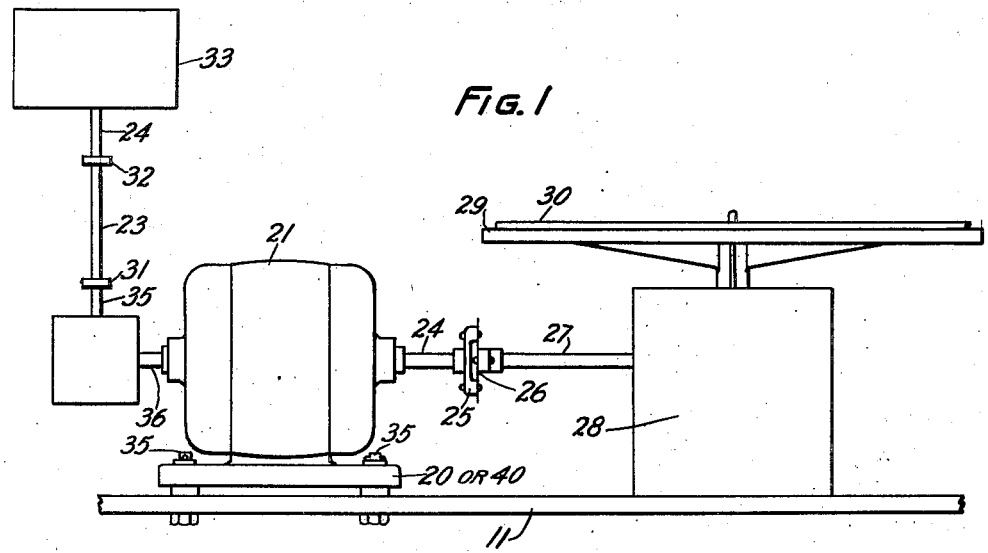
Fig. 1
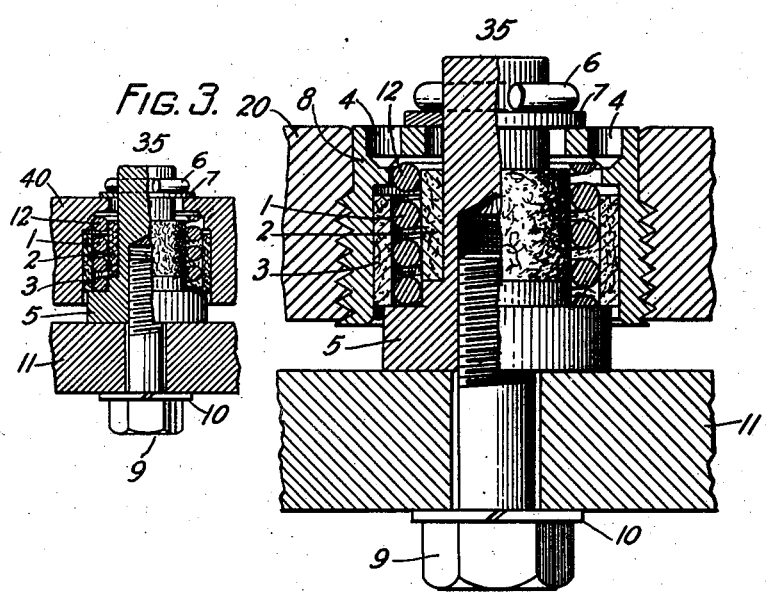
Fig. 2
Fig. 3
INVENTOR
*H. M. STOLLER*
BY *G. H. Heydt*
ATTORNEY Patented July 5, 1932

1,866,274

UNITED STATES PATENT OFFICE

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

RESILIENT SUPPORT

Application filed March 20, 1930. Serial No. 437,357.

This invention relates to a flexible mounting for electric motors and more particularly for such motors when used for driving sound recording and reproducing devices.

Single phase alternating current is available in a majority of locations and, therefore, motors using this type of current are in general use for operating motion picture apparatus. Single phase alternating current motors inherently deliver a pulsating torque at a frequency double the frequency of the source of power supply. This pulsating torque causes movements of the motor and its support in synchronism with double the frequency of the power supply which movements will hereinafter be termed vibrations. These vibrations transmit noises which are particularly objectionable in some instances. The function of spring mountings for this type of motor is to prevent the transmission of high frequency audible noises resulting from the motor operation on alternating current. On account of the rotation of the motor armature, other forces are produced having a frequency coinciding with the revolutions per second of the motor. These forces cause the motor to sway sidewise which movement of the motor will hereinafter be termed as oscillations. When the frequency of these oscillations coincides with the period of resonance, the magnitude of these oscillations becomes objectionable. The objectionable oscillations occur at what is known as the natural period of resonance between the motor mass and the motor mounting. Heretofore one of the difficulties incident to the use of spring mountings has been the tendency of the motor mass to oscillate at a particular motor speed. Resonance effects can be avoided by using springs that are stiff enough to bring this natural period above the operating speed of the motor. With such an arrangement, however, the high frequency motor noises are readily transmitted through the springs to the device on which the springs are mounted and thus radiated.

Therefore, springs of the proper resilience to prevent the transmission of audible motor noises must be provided and, since in consequence of this the natural period of resonance comes below the motor operating speed for driving recording and reproducing devices both factors must be considered in the development of this motor mounting. Such oscillations, when permitted, destroy the adjustment of delicate couplings used for connecting the motor to reproducing devices. Oscillations of this character have been known to cause a reproducing needle to jump to an adjacent groove of a record. Ingenious methods have been used for mounting motors and other devices on springs or rubber which either suppress noise to a considerable degree or suppress oscillations but which do not adequately suppress both.

The object of this invention is, therefore, to provide a mounting for a single phase alternating current motor arranged to suppress the transmission of audible noises and also suppress natural period mass oscillations.

One embodiment of the present invention comprises a vibration dampener in the form of a spring supported coupling. The outer member of said coupling is either the motor base or is attached to the motor base and the inner member is fitted over a spring dampener. This inner member is flexibly supported by a spring and is held in place by a rigid member bolted to a motion picture sound recording or reproducing device. This rigid member also forms a base for supporting the spring. Oscillation dampeners in the form of felt rings are placed between the outer circumference of the spring and the movable member of the coupling and also between the inner circumference of the spring and the rigid member. The felt rings not only dampen the oscillations of the coils of the springs which are critical at the natural period of resonance when bringing the motor up to operating speed, assuming the natural period to be below the operating speed, but also appreciably dampen the weaker oscillations which occur at the operating speed.

In the illustrated embodiment Fig. 1 shows a projector and disc reproducer with a driving motor and resilient support 5. Figs. 2 and 3 show specific forms of the structure of the resilient motor mounting.

A specific embodiment of the invention is shown in Fig. 1 in which a motor 21 is shown driving the mechanism of a sound picture reproducer. The projector 33 may be of any conventional design. The projector is associated with the driving motor through couplings 32 and 31, shafts 34, 23 and 35, a gear set in gear box 22 and shaft 36 all of which may be of a conventional design in general use. A turn table 29 for rotating the reproducing disc 30 is shown connected to the driving motor through gears of the conventional design, at 28. A reproducing arm (not shown) is normally associated with the turn table. A universal coupling is shown between the driving motor and the gears in gear box 28, interconnected by shafts 24 and 27. This universal coupling is of the well known reed type, the reed being shown at 26, connected to shaft 27 and suitably bolted to a circular disc 25.

The motor housing 21 is integral with its base 20. In Fig. 1 the resilient mountings 35 are shown in the base of the motor and bolted to the base support 11. Ordinarily four of the resilient mountings 35 are used for a motor, the base being arranged at each corner for the insertion of the mounting. The resilient mounting may be made as a unit and the base formed and threaded for receiving it as shown in Fig. 2 or it may be assembled within a formed base as shown in Fig. 3. The compactness of this resilient support makes it adaptable for use with the majority of motor bases which ordinarily extend sufficiently beyond the motor to accommodate a support of this type.

The assembled resilient mounting shown in Fig. 2 comprises a coupling with spring 1 between the two members of the couplings 8 and 5 and with pads 2 and 3 arranged to dampen oscillations. The outer portion of the cup shaped coupling member 8 is threaded and fitted to the motor base and arranged to rest on spring 1. The member 8 is shaped at 12 to the contour of the spring. The lower end of the spring rests upon the rigid support 5 which is fastened to the base support 11, by machine screw 9. A lock washer 10 retains the screw in position. At the upper portion of rigid support 5 a pin 6 and washer 7 are fitted to retain the cup shaped coupling in position at its upper extremity. The rigid support is drilled to accommodate pin 6 which pin after being inserted is bent into an S shape. A ring of felt or suitable material is shown at 2 which encircles the rigid support and is tangent to the inner surface of spring 1. A second ring of felt or suitable material is pressed into the inner surface of the cup shaped coupling and is tangent with the outer surface of spring 1. These felt rings are arranged to be pressed against the spring to prevent oscillations of the motor mass and mounting. The resilient mounting is drilled at 4 for the insertion of a tool (not shown), by means of which the support may be screwed into or out of the motor base.

The motor mounting shown in Fig. 3 is identical with that shown in Fig. 2 with the exception that the coupling member 8 has been omitted and the motor base 40 shaped the same as the cupped portion of member 8 to receive the spring 1, pads 2 and 3 and rigid member 5.

In the development of this new motor mounting, Hook's law was taken into consideration which states that the force developed by a spring is proportional to the displacement. However, as previously stated, a spring mounting for a motor which drives sound picture mechanism must have the proper resilience to prevent the transmission of audible motor noises, must be stiff enough for mechanical rigidity and must also be arranged to prevent oscillations. In order to produce such a mounting a new formula for the selection or manufacture of a spring for this purpose was developed.

The characteristics of the high frequency vibrations transmitted from the motor to the base were first considered for which the following formula was used.

$$F = K_2 S$$

where
F is the force transmitted to the base;
S is the stiffness of the spring mounting in pounds per mil displacement;
$K_2$ is a constant.

This formula shows that the weaker the spring the less the vibration transmitted, but in order that the mounting may have sufficient lateral stiffness it is desirable not to make S any smaller than necessary. Another consideration in the choice of S is the location of the natural period frequency of oscillation between the mass of the motor and the spring mounting. This is determined by the following formula:

$$\frac{1}{Fo} = K_1 \sqrt{\frac{W}{gS}}$$

in which
Fo is the natural period of motor on mountings;

$\frac{W}{g}$ is the mass of motor in pounds;

S is the stiffness of spring mounting in pounds per mil displacement;
$K_1$ is a constant dependent on the numerical units employed and for the above definition of $\frac{W}{g}$ and S. $K_1$ equals 0.06785.

In order to minimize these natural period oscillations it is obvious that Fo should not coincide with the frequency of rotation of the motor, since such a condition would give rise to considerable oscillations with only small amounts of mechanical unbalance of the rotating armature. It is thus necessary to locate Fo either above or below the frequency of rotation of the motor. In order to minimize the transmission of noise to the base, the formula $F=K_2 S$ shows that S should be small, therefore the best choice for S is such that Fo is below the frequency of rotation rather than above. However, in order to provide reasonable lateral stiffness it is preferable to make Fo only low enough to avoid natural period oscillations.

The following formula was evolved from the foregoing to meet all requirements.

$$\frac{1}{f\theta} = K_1 \sqrt{\frac{W}{gS}}$$

where $\theta$ is a factor between .65 and .85, and $f$ is the frequency of rotation of the motor. Assuming the mean value of $\theta$ as .75 and a motor speed of 20 revolutions per second, a motor weight of 20 pounds per spring mounting the formula becomes:

$$\frac{1}{(20)(.75)} = K_1 \sqrt{\frac{20}{(32.2)(S)}}$$

From which the value of S is readily computed being equal to 0.64 pounds per mil displacement. This provides for the selection or manufacture of a suitable spring, consisting in this case of four turns of .125″ steel wire, each turn having a mean diameter of .625″.

It is not the intention to limit this resilient mounting to the specific form shown for single phase motors or to the specific form of materials used for dampening oscillations, since a number of materials are contemplated by the inventor for this purpose.

What is claimed is:

1. In a structure for supporting a vibrating and oscillating device, a vibration dampener comprising a coupling and a compression spring within said coupling and an oscillation dampening device comprising a pad fitted between the outer surface of said spring coils and the surface of said coupling and a second pad fitted between the inner surface of said spring coils and said coupling.

2. In a structure for supporting a vibrating and oscillating device, a base for said device, vibration dampeners comprising hollow coupling members in said base, a coil compression spring fitted into each of said couplings, a secondary coupling member extending through the center of each of said springs and said hollow members to support each spring and thereby flexibly support said device and dampening means for sustaining the spring coils to substantially eliminate oscillations of said device, comprising rigid extensions on said coupling members to sustain the outer surface of the top coil and inner surface of the bottom coil of each spring and resilient members fitted against the remaining outer and inner surfaces of the coils of each spring.

3. In a resilient mounting for a motor, a motor base adapter comprising a member arranged for insertion in a motor base, a compression spring for flexibly supporting said member, a rigid member for supporting the base of said spring, and oscillation dampeners fitted between the member inserted in said base and the outer surface of said spring and between the rigid support and the central surface of said spring.

In witness whereof, I hereunto subscribe my name this 18th day of March, 1930.

HUGH M. STOLLER.